UNITED STATES PATENT OFFICE.

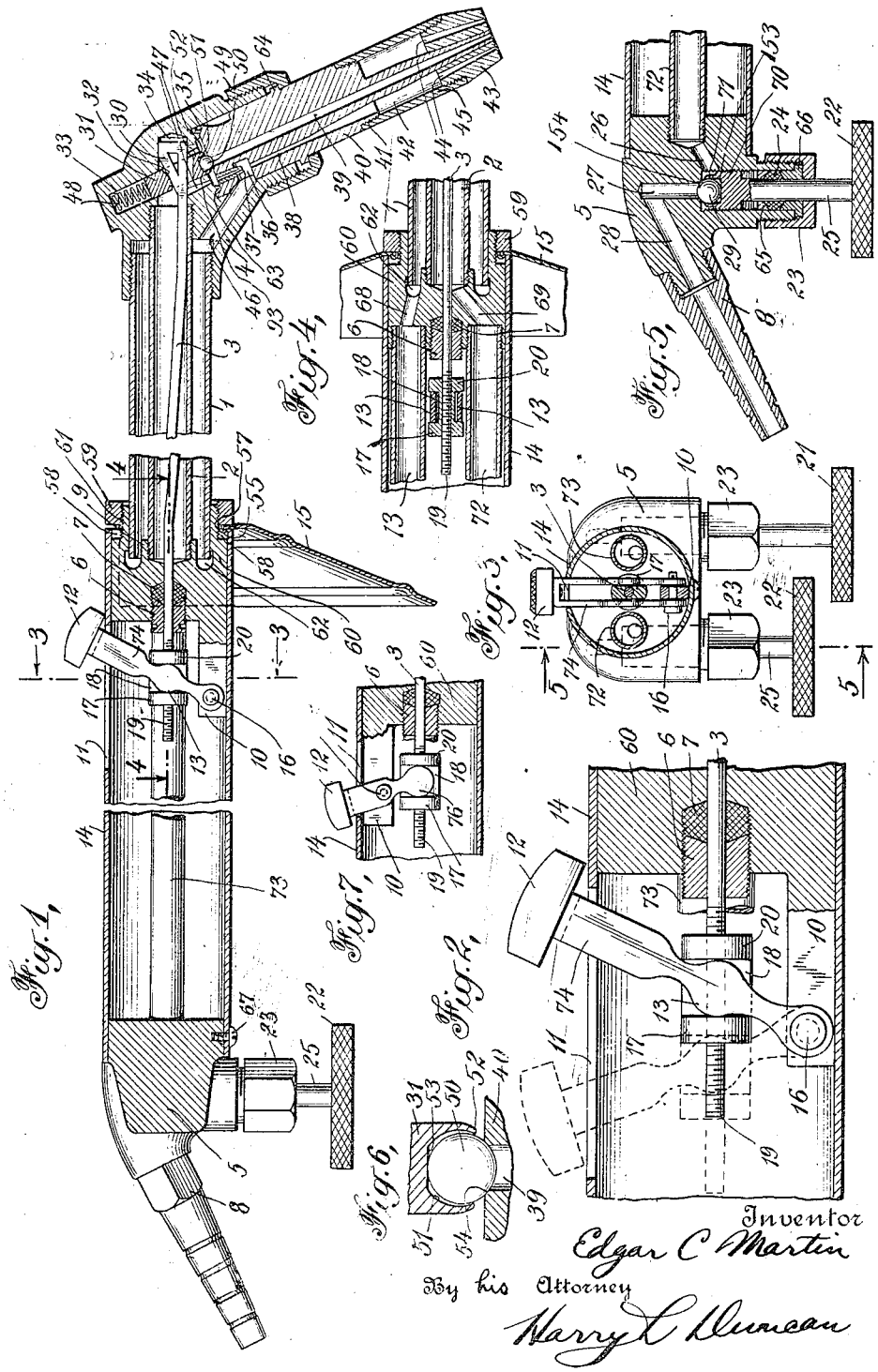
E. C. MARTIN.
WELDING AND CUTTING BLOWPIPE.
APPLICATION FILED JUNE 8, 1916.
1,237,535. Patented Aug. 21, 1917.
Inventor
Edgar C Martin
By his Attorney
Harry L Duncan

EDGAR C. MARTIN, OF CENTRAL, SOUTH CAROLINA, ASSIGNOR TO PRATT & CADY COMPANY, INCORPORATED, OF HARTFORD, CONNECTICUT, A CORPORATION OF NEW YORK.

WELDING AND CUTTING BLOWPIPE.

1,237,535.  Specification of Letters Patent.  Patented Aug. 21, 1917.

Application filed June 8, 1916. Serial No. 102,483.

*To all whom it may concern:*

Be it known that I, EDGAR C. MARTIN, a citizen of the United States, and resident of Central, Pickens county, South Carolina, have made a certain new and useful Invention Relating to Welding and Cutting Blowpipes, of which the following is a specification, taken in connection with the accompanying drawing, which forms part of the same.

This invention relates especially to blowpipes for welding or cutting metals as by the use of oxy-acetylene cutting jets and in which a ball shut-off valve is used to control the cutting jet and to instantly shut off the same in case of necessity. The blowpipe is also preferably provided with a detachable shield which may be readily and securely attached to the blowpipe handle in any desired angular position.

In the accompanying drawing showing in a somewhat diagrammatic way illustrative embodiments of this invention, Figure 1 is a vertical longitudinal section.

Fig. 2 is an enlarged sectional detail showing the valve actuating devices.

Fig. 3 is a transverse sectional view taken substantially along the line 3—3 of Fig. 1.

Fig. 4 is a horizontal sectional detail taken substantially along the line 4—4 of Fig. 1.

Fig. 5 is a vertical section showing the regulating valves.

Fig. 6 is a sectional detail showing the shut-off valve; and

Fig. 7 is a sectional detail showing a modified valve actuating device.

The blowpipe may have any desired construction and may comprise a stem 1 screwed or otherwise secured to the head 4 into which may also be screwed the tube 2 having, if desired, a screw connection at its rear end with the flange 9 on the junction member 60. The stem may also engage this junction member and be soldered or otherwise connected thereto, if desired, a suitable annular recess 62 and communicating passage 68 being preferably formed in this member for the passage of heating gas or gases from the tubular connection 73 into the annular space between the tube 2 and stem 1 as shown in Figs. 1 and 4. The oxygen or other supporter of combustion for these heating gases may, if desired, be supplied from the tubular connection 72 to the passage 69 communicating with the inside of the tube 2 so as to supply this oxygen, for instance, to the head. These tubular connections 72, 73 which may, if desired, be screwed into the junction member 5 at the rear of the blowpipe which may be formed with suitable gas nipples or connections 8 for the acetylene or other heating gas and for the oxygen or supporter of combustion therefor, the holes in these nipples communicating in each case with a passage, such as 28, and communicating valve passage 27 with which may coöperate a suitable regulating valve of any desired description so as to regulate the supply of these gases to the blowpipe through the connected valve handles 21, 22. If desired, these regulating valves may be of the ball valve type as indicated and may comprise the valve plug 70 which may be threaded within the valve casing, provided, if desired, with the gland bushings 65, 66 between which the packing 24 may be held as by the nut 23. Thus when the handle 22 on the valve stem 25 is rotated the valve plug 70 is advanced a corresponding distance toward the valve seat 154 and the ball valve 29 is carried forward correspondingly. The valve may, if desired, be loosely mounted within the valve plug so as to give a self-alining action and allow it to seat itself accurately as it is pushed forward by the alining actuating surface 153 which is preferably parallel to the valve seat 154 and of sufficient extent to allow some slight lateral adjustment of the valve within its socket in the plug. As indicated a suitable passage, such as 26, from the valve seat may communicate with the tubular connection, such as 72 so as to carry the oxygen or other burning gases to the junction member and head. The acetylene is supplied through the acetylene passage 46 to the injector casing 36 which may be formed in the removable cutittng tip 40. The acetylene may then be drawn by the oxygen jet supplied through the passages 47 and injector nozzle 37 into the heating passage 38 which may communicate with the annular space 42 within the casing 45 screwed at 41 to the tip 40 and similarly secured to the end 43. This mixed oxygen and acetylene, for instance, may thus supply the series of heating jet discharge conduits 44 around the central cutting jet 39 at the end of the tip. In order to readily secure the removable cutting tip in position the securing collar 49 may be screwed on the head as indicated so as to tightly hold the coöperating flange 64 on the tip and force the reduced area junction members on the tip and head into engagement. These junction or joint members may, for instance, comprise the reduced area flange 63 on the head with which the flat coöperating end of the tip may be forced into tight engagement and it is desirable to form the tip with a projecting protecting ledge 35 around the joint area thereof so as to prevent distortion of this part of the tip by accidental falls or the like.

The shut-off valve is preferably located in the head of the blowpipe so as to coöperate with the cutting passage 39 which may, if desired, be axially located within the cutting tip. In this way whenever one of these replaceable cutting tips is secured in the head its cutting passage is simultaneously brought into substantial alinement with the shut-off valve which may with advantage be of the ball valve type and loosely mounted so as to have an automatic alining action promoting the tight closure of the cutting passage in the tip. If desired this valve may be loosely mounted in a valve plug or support, such as 31, guided in a suitable recess 33, and extension 93 thereof in the head, and for some purposes this shut-off valve may have a normally closing tendency or be forced into closed position as by the spring 48 in this recess. It is desirable to provide this shut-off valve with a loosely mounted ball valve 50 coöperating with the valve seat 54 in the tip as indicated in Figs. 1 and 6, so that any slight lack of alinement between the valve plug and seat may be compensated for and the tight closure of this oxygen shut-off valve insured under operating conditions. For this purpose the valve socket 51 is of such size and form as to allow some slight lateral movement of the valve, a hundredth of an inch or so play on both sides of the valve being desirable, while at the same time the valve is held in the plug as by the inwardly flanged over or bent holding flange 52. It is desirable in order to insure the effective closing of the valve to provide the valve plug or support with an alining actuating surface, such as 53, preferably substantially parallel to the valve seat 54 so that the valve is forced evenly home against its seat under all conditions. This shut-off valve may be opened by any suitable actuating devices, and, for example, an actuator cam 32 may be mounted in the recess 34 in the head and may coöperate with the inclined socket 32 in the valve plug. The actuator rod 3 connected to this cam may extend through the packing gland 6 and packing 7 in the junction member 60 and may be longitudinally moved by a suitable manually operated lever. The actuator lever 74 may, for example, be pivoted about the pin 16 in the lever bracket 10 secured to or formed integral with the junction member 60 and the free end of this lever may, for example, extend through a lever slot 11 in the tubular handle 14 secured as by the screws 67 on the connector member so that a thumb piece or enlargement 12 on the end of this lever is always convenient for actuation by the thumb of the operator. If desired, this actuator lever may be of the bifurcated or yoke form shown in Fig. 3 and may extend around a suitable slotted nut or head 18 adjustably screwed on the threaded end 19 of the actuator rod so that the rounded or enlarged actuating portions 13 of this lever may lie between and coöperate with the flanges 17, 20 on this nut as seen in Figs. 1 and 2. Thus when the thumb piece 12 is moved backward into the dotted line position the nut and connected actuator rod 3 are longitudinally moved to a corresponding extent, thus opening the shut-off valve 50. The increased leverage secured in this way enables the operator to quickly and certainly operate the shut-off valve under working conditions. Another form of actuator lever which may be used in this same general way is shown in Fig. 7 as pivoted at its intermediate portion about the pin 75 in the lever bracket 10 while its bifurcated free ends 76 are given a rounded enlarged form so as to engage and longitudinally move the flanges 17, 20 on the slotted nut screwed on the end 19 of the actuator rod 3. The shut-off valve may thus be moved by oscillating the thumb piece 12, a forward movement of this thumb piece opening the shut-off valve in this instance, while when the thumb piece is moved into the rearward position indicated in Fig. 7 the shut-off valve is closed.

Under some operating conditions it is desirable to have a shield for the operator's hand interposed between the tip of the cutting or welding blowpipe and the handle and it is of considerable advantage to have such a shield detachable and so arranged as to be readily and quickly secured in position and also angularly adjusted in some instances about the blowpipe handle, as more fully illustrated and described in my copending application, Serial No. 98,020, filed May 17, 1916, which claims this shield construction. For this purpose the shield 15 which may be of any suitable metal or material and if desired strengthened by forming reinforcing ribs therein as indicated, may be formed with a circular alining recess or aperture, such as 57, adapted to loosely encircle the coöperating part of the blowpipe so as to be clamped in position thereon as by the retaining collar 59 which may be threaded on the forward extension or threaded neck 61 of the junction member 60.

It is also desirable to form suitable locking lugs, such as 55, on the shield adjacent this aperture, a series of such lugs being desirable and preferably formed of such size as to extend within the locking recess 58 on the blowpipe member. In this way the shield may be readily attached to the blowpipe and securely held thereto by the interlocking action of the locking lugs and recess while by slightly loosening the retainer collar 59 the shield may be swung angularly about the handle of the blowpipe into any desired angular position in which it may be instantly clamped or locked. At the same time the shield may be entirely removed from the blowpipe since the operator may manually unscrew the retaining collar 59 without the use of any special tools and this retainer collar may then be screwed tightly home against the end of the handle 14, thus giving a finished appearance to this part of the device when the shield is not in use.

This invention has been described in connection with a number of embodiments, forms, arrangements, proportions, parts, materials and devices, to the details of which disclosure the invention is not of course to be limited, since what is claimed as new and what is desired to be secured by Letters Patent is set forth in the appended claims.

Claims:

1. The cutting or welding blowpipe comprising a handle, a head connected thereto, means to supply oxygen and heating gas to said head, an interchangeable tip removably mounted in said head and formed with a central shut-off valve seat, a recess in said head substantially in line with said valve seat, a spring-pressed valve plug mounted in said recess, a ball shut-off valve loosely mounted in said valve plug to coöperate with said valve seat and actuating devices for said shut-off valve comprising an actuator rod coöperating with said plug, a slotted nut on said rod, an actuator lever having its end pivoted within said handle and having enlarged actuating portions engaging the slots on both sides of said nut, said lever projecting through a slot in said handle and being formed with a thumb piece.

2. The cutting or welding blowpipe comprising a handle, a head connected thereto, means to supply oxygen and heating gas to said head, an interchangeable tip removably mounted in said head and formed with a shut-off valve seat, a recess in said head substantially in line with said valve seat, a spring-pressed valve plug mounted in said recess, a shut-off valve loosely mounted in said valve plug to coöperate with said valve seat and actuating devices for said shut-off valve comprising an actuator rod coöperating with said plug, a slotted nut on said rod, an actuator lever pivoted within said handle and having enlarged actuating portions, engaging the slots on both sides of said nut, said lever projecting through a slot in said handle and being formed with a thumb piece.

3. The cutting or welding blowpipe comprising a handle, a head connected thereto, means to supply oxygen and heating gas to said head, an interchangeable tip removably mounted in said head and formed with a shut-off valve seat, a recess in said head substantially in line with said valve seat, a valve plug mounted in said recess, a shut-off valve loosely mounted in said valve plug to coöperate with said valve seat and actuating devices for said shut-off valve comprising an actuator rod coöperating with said plug, a slotted nut on said rod, an actuator lever pivoted within said handle and having actuating portions engaging the slots on both sides of said nut, said lever projecting through a slot in said handle.

4. The cutting or welding blowpipe comprising a hollow handle, a head connected thereto, means to supply oxygen and heating gas to said head, an interchangeable tip removably mounted in said head and formed with a shut-off valve seat, a spring-closed valve mounted in said head to coöperate with said valve seat and actuating devices for said shut-off valve comprising an actuator rod coöperating with said valve, a slotted member on said rod, an actuator lever having its end pivoted within said handle and having enlarged actuating portions engaging the slots on both sides of said member, said lever projecting from said handle.

5. The cutting or welding blowpipe comprising a hollow handle, a head connected thereto, means to supply oxygen and heating gas to said head, a tip mounted in said head and formed with a shut-off valve seat, a spring-closed valve mounted in said head to coöperate with said valve seat and actuating devices for said shut-off valve comprising an actuator rod coöperating with said valve, a slotted member on said rod, an actuator lever pivoted within said handle and having actuating portions engaging the slots on both sides of said member, said lever projecting from said handle.

6. The cutting or welding blowpipe comprising a hollow handle, a head connected thereto, means to supply oxygen and heating gas to said head, a tip mounted in said head and formed with a shut-off valve seat, a valve mounted in said head to coöperate with said valve seat and actuating devices for said shut-off valve comprising an actuator rod coöperating with said valve, a member on said rod, an actuator lever pivoted within said handle and having actuating portions engaging said member, said lever projecting from said handle.

7. The cutting or welding blowpipe comprising a tubular handle, a head connected thereto, means to supply oxygen and heating gas to said head, a spring-pressed ball shut-off valve mounted in said head and actuating devices for said shut-off valve comprising an actuator rod extending through a tight packed joint into said handle, a slotted nut on said rod, an actuator lever having its end pivoted within said handle and having enlarged actuating portions engaging the slots on both sides of said nut, said lever projecting through a slot in said handle and being formed with a thumb piece.

8. The cutting or welding blowpipe comprising a tubular handle, a head connected thereto, means to supply gas to said head, a pressed shut-off valve mounted in said head and actuating devices for said shut-off valve comprising an actuator rod extending through a tight packed joint into said handle, a slotted nut on said rod, an actuator lever having its end pivoted within said handle and having actuating portions engaging the slots on both sides of said nut, said lever projecting through a slot in said handle and being formed with a thumb piece.

9. The cutting or welding blowpipe comprising a tubular handle, a head connected thereto, means to supply gas to said head, a pressed shut-off valve mounted in said head and actuating devices for said shut-off valve comprising an actuator rod extending through a tight packed joint into said handle, a nut on said rod, an actuator lever having its end pivoted within said handle and having actuating portions engaging said nut, said lever projecting through a slot in said handle.

10. The cutting or welding blowpipe comprising a handle, a head connected thereto, means to supply gases to said head, a shut-off valve, and actuating devices for said shut-off valve comprising an actuator rod, a projecting actuator lever having its end pivoted within said handle and having actuating portions loosely coöperating with both sides of said rod.

11. The cutting or welding blowpipe comprising a handle, a head connected thereto, means to supply gases to said head, a shut-off valve, and actuating devices for said shut-off valve comprising an actuator rod, a projecting actuator lever pivoted within said handle and having actuating portions loosely coöperating with said rod.

12. A cutting or welding blowpipe comprising a head, an interchangeable tip removably mounted in said head and formed with a central shut-off valve seat, a recess in said head substantially in line with said valve seat, a valve plug mounted in said recess, a ball valve loosely mounted in said valve plug to coöperate with said valve seat, said valve plug being provided with an alining actuating surface engaging said ball valve and substantially parallel to said valve seat to promote the lateral self-alining action of said valve and coöperating actuating devices to operate said valve plug.

13. A cutting or welding blowpipe comprising a head, a tip removably mounted in said head and formed with a valve seat, a spring-pressed valve plug mounted in said head substantially in line with said valve seat, a ball valve loosely mounted in said valve plug to coöperate with said valve seat, said valve plug being provided with an alining actuating surface engaging said ball valve and substantially parallel to said valve seat to promote the lateral self-alining action of said valve, and coöperating actuating devices to operate said valve plug.

14. A cutting or welding blowpipe comprising a head, a tip removably mounted in said head and formed with a valve seat, a valve plug mounted in said head substantially in line with said valve seat, a ball valve loosely mounted in said valve plug to coöperate with said valve seat, said valve plug being provided with an alining actuating surface engaging said ball valve to promote the lateral self-alining action of said valve, and coöperating actuating devices to operate said valve plug.

15. A cutting or welding blowpipe comprising a head, a tip mounted in said head and formed with a valve seat, a ball shut off valve loosely mounted in said head substantially in line with said valve seat and coöperating actuating devices to operate said valve and allow the lateral self-alining action of said valve.

EDGAR C. MARTIN.

Witnesses:
RAE C. PALMER,
MARY M. SWIFT.